US012789634B2

(12) United States Patent
Winckler

(10) Patent No.: US 12,789,634 B2
(45) Date of Patent: Nov. 10, 2026

(54) BRUSH ASSEMBLY

(71) Applicant: Caterpillar Inc., Peoria, IL (US)

(72) Inventor: Kurt L. Winckler, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 273 days.

(21) Appl. No.: 18/792,000

(22) Filed: Aug. 1, 2024

(65) Prior Publication Data

US 2026/0034891 A1 Feb. 5, 2026

(51) Int. Cl.

*B60L 5/08* (2006.01)
*B60L 5/12* (2006.01)
*B60L 5/36* (2006.01)
*B60L 5/38* (2006.01)
*H01R 41/00* (2006.01)

(52) U.S. Cl.

CPC *B60L 5/08* (2013.01); *B60L 5/12* (2013.01); *B60L 5/36* (2013.01); *B60L 5/38* (2013.01); *B60L 2200/40* (2013.01); *H01R 41/00* (2013.01); *H01R 2201/26* (2013.01)

(58) Field of Classification Search

CPC .......... B60L 5/38; B60L 5/36; B60L 2200/40; B60L 5/08; H01R 41/00; H01R 2201/26
USPC .......... 191/59.1
See application file for complete search history.

(56) References Cited

U.S. PATENT DOCUMENTS 3,537,058 A 10/1970 Lucien
12,322,918 B2 * 6/2025 Strashny ................. B60L 5/085
12,413,035 B2 * 9/2025 Strashny ................. B60L 5/085
12,552,259 B2 * 2/2026 Strashny ................. B60L 5/38
2016/0272088 A1 9/2016 Furrer et al.
2021/0170876 A1 6/2021 Grothe
2023/0231349 A1 * 7/2023 Strashny ................. B60L 5/085 191/45 R
2023/0231350 A1 7/2023 Strashsny
2023/0391202 A1 * 12/2023 Strashny ................. B60L 5/38
2024/0006835 A1 * 1/2024 Strashny ................. B60L 5/085
2025/0178445 A1 * 6/2025 Strashny ................. B60L 5/38
2025/0183565 A1 * 6/2025 Strashny ................. B60M 1/30

FOREIGN PATENT DOCUMENTS

CN 203283039 U 11/2013
CN 219321790 U 7/2023
CN 110154768 B 9/2023

(Continued)

OTHER PUBLICATIONS

Written Opinion and International Search Report for Int'l. Patent Appln. No. PCT/US2025/039212, mailed Nov. 21, 2025 (9 pgs).

*Primary Examiner* — Zachary L Kuhfuss
(74) *Attorney, Agent, or Firm* — Bookoff McAndrews PLLC

(57) ABSTRACT

An assembly may include a contact element, a terminal element extending from a portion of the contactor assembly towards the contact element, and a cup. The cup may have an inner cavity, a bottom end, and a top end. The bottom end of the cup may be attached to the contact element. The assembly may further include a flexible material between the contact element and the terminal element, the flexible material forming a chamber. The assembly may include an electrically conductive fluid within chamber, and a biasing member between the terminal element and the cup.

20 Claims, 7 Drawing Sheets

(56) References Cited

FOREIGN PATENT DOCUMENTS

| | | | |
|---|---|---|---|
| CN | 220673046 | U | 3/2024 |
| DE | 202004009416 | U1 | 10/2004 |
| EP | 1932224 | B1 | 7/2016 |
| WO | 2013066792 | A1 | 5/2013 |

* cited by examiner

BRUSH ASSEMBLY

TECHNICAL FIELD

The present disclosure relates generally to electrical contacts, and more particularly, to a brush assembly.

BACKGROUND

Dynamic energy transfer systems may include mobile machines, such as vehicles, that receive power from electricity-conducting rail systems. In such systems, an electricity-conducting connector assembly may be used to connect the vehicle to the rail system via a number of brush assemblies within the connector assembly. The brush assemblies may each have a brush that contacts the rail such that power may flow from the rail system to the vehicle. Often, pressure is exerted on the brush to aid in maintaining contact with the rail assemblies. The devices and methods used to provide such downward pressure to the brush may be complicated and require actively controlled systems which may be subject to fluid leaks, wear, degradation, or failure.

U.S. Patent Application Publication No. 2023/0231349, published on Jul. 20, 2023 ("the '349 publication"), describes a slidable current collector having an array of terminals with carbon brushes for contacting conductor rails to deliver electrical power to a moving work machine. The terminals have upper sections with a conductive post, lower sections that include a reservoir of liquid metal, and bladders that connect the upper sections with the lower sections. Magnets surround outer shells of the terminals. Fluid above a threshold pressure fed into the bladders holds the upper sections apart from the lower sections and forces the magnets away from the conductor rails. Fluid below the threshold pressure allows the magnets to clamp the terminals to the conductor, lowers the conductive post into the liquid metal, and urges the carbon brushes against the conductor rails. The bladders provide a fluid suspension distributed across the array of terminals, enabling consistent electrical contact and wear for the carbon brushes. However, the fluid system within the brush assembly of the '349 publication requires an actively controlled fluid system which may be subject to fluid leaks, wear, degradation, or failure.

The brush assembly of the present disclosure may solve one or more of the problems set forth above and/or other problems in the art. The scope of the current disclosure, however, is defined by the attached claims, and not by the ability to solve any specific problem.

SUMMARY

In one aspect, the disclosure relates to a brush assembly for electrically connecting a contactor assembly to an electricity-conducting rail system. The brush assembly may include a contact element, a terminal element extending from a portion of the contactor assembly towards the contact element, and a cup. The cup may have an inner cavity, a bottom end, and a top end, the bottom end of the cup being attached to the contact element. The brush assembly may further include a flexible material between the contact element and the terminal element, the flexible material forming a chamber. The brush assembly may also include an electrically conductive fluid within chamber and a biasing member between the terminal element and the cup.

In another aspect, the disclosure relates to a trailing arm assembly for use in a dynamic energy transfer system. The trailing arm assembly may include a boom assembly, a trailing arm assembly, and a contactor assembly having a brush assembly. The brush assembly may further include a contact element having a first side and a second side opposite the first side, a terminal element, a flexible material extending from the terminal element towards the contactor assembly and forming a chamber around the terminal element, an electrically conductive fluid within the chamber formed by the flexible material, and a biasing member located axially between the terminal element and the contact element. The biasing member may be configured to passively bias the contactor assembly away from the terminal element.

In another aspect, the disclosure relates to a brush assembly for electrically connecting a contactor assembly to an electricity-conducting rail system. The brush assembly may include a contact element having a first side and a second side, a terminal element having a flange, a cup attached to the second side of the contact element, and a flexible material extending between the terminal element and the contact element. The flexible material may form a chamber. The brush assembly may further include a biasing member between the cup and the terminal element. The biasing member may passively bias the contact element away from the terminal element.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
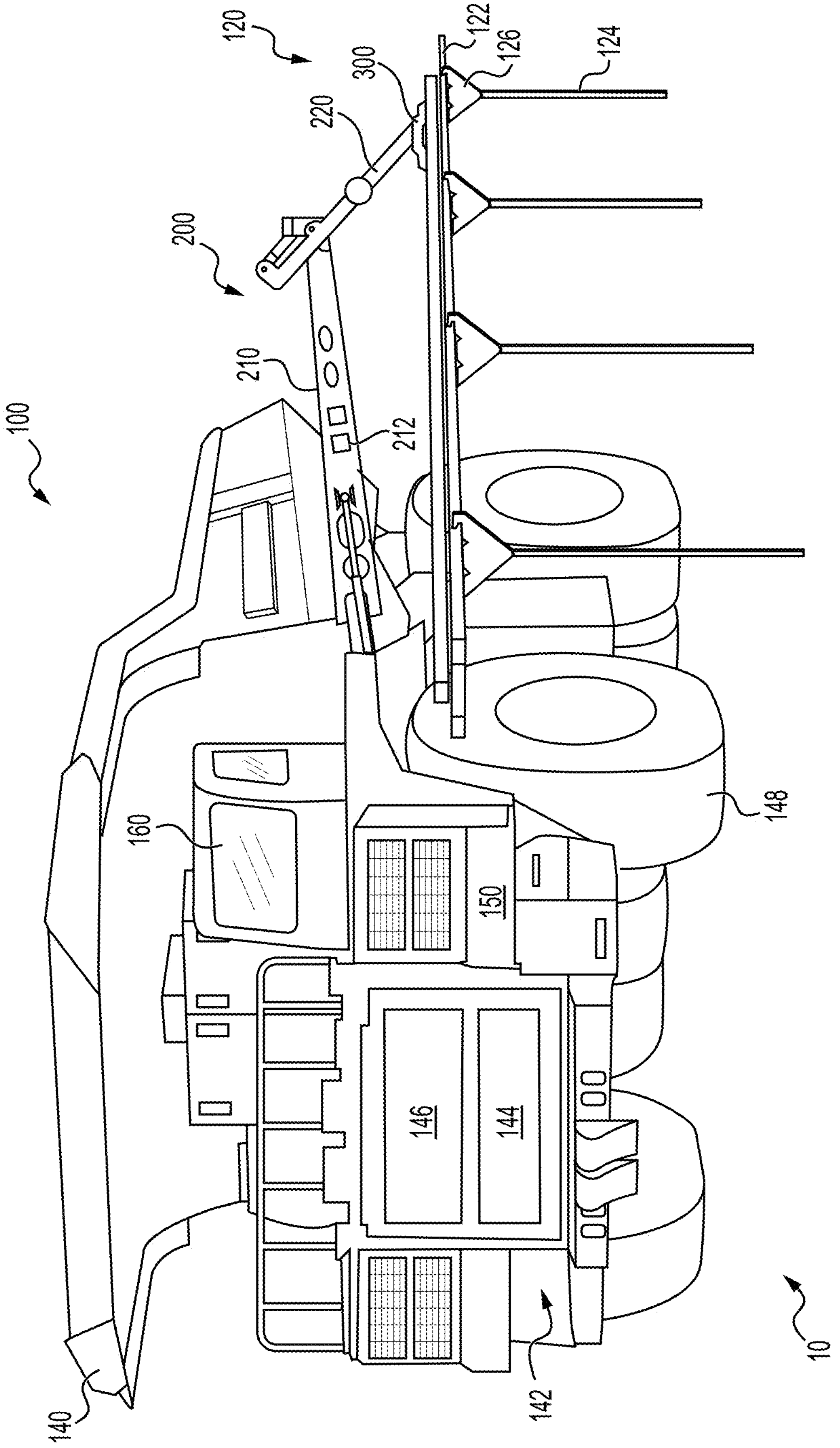
FIG. 1 is a perspective view of a mobile machine including a contactor assembly for coupling with a conductive rail system, according to aspects of the present disclosure.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of +10% in the stated value.

As used herein, the terms "upstream" and "proximal" are intended to locationally identify components, parts, assemblies, and systems located closer to the frame/body of the mobile machine. Conversely, the terms "downstream" or "distal" are intended to locationally identify components, parts, assemblies, and systems located farther away from the frame/body of the mobile machine.

FIGS. 1-6B depict a mobile machine power system 100 wherein a mobile machine 140 connects to an electricity-conducting rail system 120 using an electricity-conducting connector assembly 200. The electricity-conducting connector assembly 200 may include a contactor assembly 300 having a brush assembly 400 (FIG. 4) that contacts and slides along the electricity-conducting rail system 120 as the contactor assembly 300 moves along the electricity-conducting rail system 120, allowing power or current to flow between the electricity-conducting rail system 120 and the mobile machine 140. The brush assembly 400 may include a brush 420 axially spaced from a slug 404 via a biasing member, such as spring 410. The spring 410 may provide a biasing force on the brush 420 to help maintain contact with the electricity-conducting rail system 120 and allow the brush assembly 400 to transition between an uncompressed state and a compressed state.

FIG. 1 depicts the mobile machine power system 100 including the mobile machine 140 having an electricity-conducting connector assembly 200, and the electricity-conducting rail system 120 for providing electric power to the mobile machine 140. The mobile machine 140 includes an electric drive system 142 having at least one electric motor 144 and at least one battery system 146. The electric drive system 142 drives a set of ground-engaging elements 148, such as tires or continuous tracks, for propelling and maneuvering the mobile machine 140. The mobile machine 140 also includes a frame/body 150 which supports the mobile machine's mechanical components, including the electricity-conducting connector assembly 200. The mobile machine 140 may include either a hybrid or an all-electric power system, and the electricity-conducting rail system 120 may be applied to either system. The mobile machine 140 and its various systems may be controlled via a machine operator located in the operator cabin 160, or the mobile machine 140 may be semi- or fully-autonomous or remotely operated.

The mobile machine 140 is free-steering, allowing the operator of the machine (or autonomous control system) to freely control the direction and route of the mobile machine 140. Thus, the mobile machine 140 is configured to travel (e.g., in a free-steering manner) selectively along a work route or path within a job site, with the electricity-conducting rail system 120 positioned generally along the route or path. The mobile machine 140 of FIG. 1 is shown as a vehicle, and more particularly, mobile machine 140 is shown in the context of a mining truck, which is commonly used for transporting ore in a mine environment. The present disclosure is not so limited, however, and other types of machines (e.g., vehicles) are within the scope of the present disclosure, including articulated trucks, asphalt pavers, backhoe loaders, drills, rope shovels, excavators, forest machines, hydraulic mining shovels, material handlers, motor graders, off-highway trucks, pipelayers, road reclaimers, telehandlers, track loaders, underground mining dump loaders and trucks, wheel loaders, wheel tractor-scrapers, or other machines.

The electricity-conducting rail system 120 includes a plurality of elevated conductor rails 122 connected to a power source (e.g., a power grid, generator, or energy storage devices, not shown). The conductor rails 122 may be supported by a plurality of ground-engaging support poles 124 and rail bracket assemblies 126. While FIG. 1 shows an example where the plurality of conductor rails 122 contains three conductor rails, the plurality of conductor rails 122 may contain fewer or more rails. In this example, two of the conductor rails provide electrical power at different polarities (e.g., a conductor rail with a positive polarity and a conductor rail with a negative polarity) while the third conductor rail provides a reference of 0 volts (e.g., a ground rail). The elevated conductor rails 122 may have a height, for example, in the range of about 8 to about 15 feet above the ground 10. In this example, the middle rail of the plurality of conductor rails 122 is at a greater height than the two side rails. Thus, the electricity-conducting rail system does not form a pantograph-type overhead power system, nor an under-machine or low-ground-located power system.

The electricity-conducting connector assembly 200 electrically connects the mobile machine 140 to the electricity-conducting rail system 120. The electricity-conducting connector assembly 200 includes a boom assembly 210 having a proximal end and a distal end; an arm assembly, such as a trailing arm assembly 220, having a proximal end connected to the distal end of the boom assembly 210; and a contactor assembly 300 connected to a distal end of the trailing arm assembly 220. As used herein, the term "trailing" refers to a direction opposite the forward direction of travel of the mobile machine 140. The boom assembly 210 houses a hydraulic system 212 for pivotably extending, retracting, and locking the boom assembly 210 and an integrated busbar for transferring electrical energy along a length of the boom assembly 210. It is understood that hydraulic system 212 may instead be replaced with a pneumatic assembly without departing from the scope of this disclosure.

As shown in FIG. 1, the boom assembly 210 extends generally horizontally from a side of the mobile machine and is connected to a side of the frame/body 150 of the mobile machine 140 about a pivot joint (or other relative movement enabling joint configured to enable relative movement between mobile machine 140 and boom assembly 210). The pivot joint is located at a height of approximately over 8 feet on the machine (above the ground 10), or otherwise at a height equal to or above the electricity-conducting rail system 120. The electricity-conducting connector assembly 200 includes several different states of deployment, including an extended state in which the boom assembly 210 is extended generally horizontally outward away from a side of the mobile machine 140 (as shown in FIG. 1), a retracted state (not shown) in which the boom assembly 210 is rotated or pivoted inward to rest against the frame/body 150 of the mobile machine 140 (not shown), and a locked state in which the boom assembly is locked to the side of the frame/body 150 of the mobile machine 140 in the retracted state by a hydraulically-actuated locking pin (not shown). The boom assembly 210 may be engaged or disengaged from the electricity-conducting rails system 120 by the operator, remotely, or autonomously via an engagement or disengagement procedure, or automatically by the mobile machine 140. While the boom assembly 210 is shown to be attached to a mining truck, the same boom assembly 210 is capable of being coupled to various types of mobile machines 140 by use of an interchangeable adapter (not shown) that is specific to the type of machine being operated.

The trailing arm assembly 220 forms a mechanical and electrical connection between boom assembly 210 and contactor assembly 300, and may include one or more arms. The one or more arms may be extendable and retractable (e.g., pneumatically, hydraulically, or mechanically) and may have multiple degrees of freedom to allow for vertical and lateral pivoting about the boom assembly 210.

Figure 2:
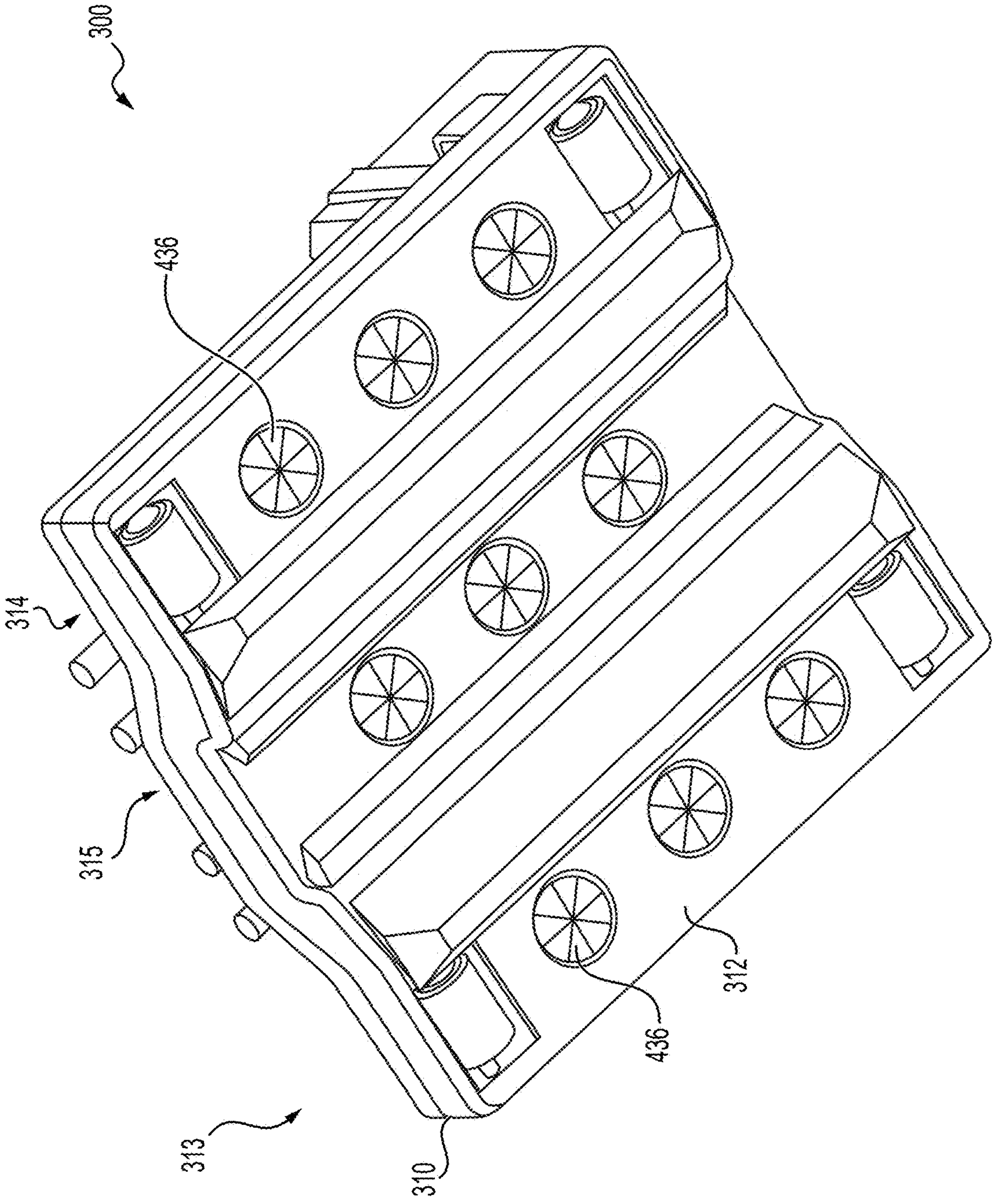
FIG. 2 is a bottom perspective view of the contactor assembly of FIG. 1.
Figure 3:
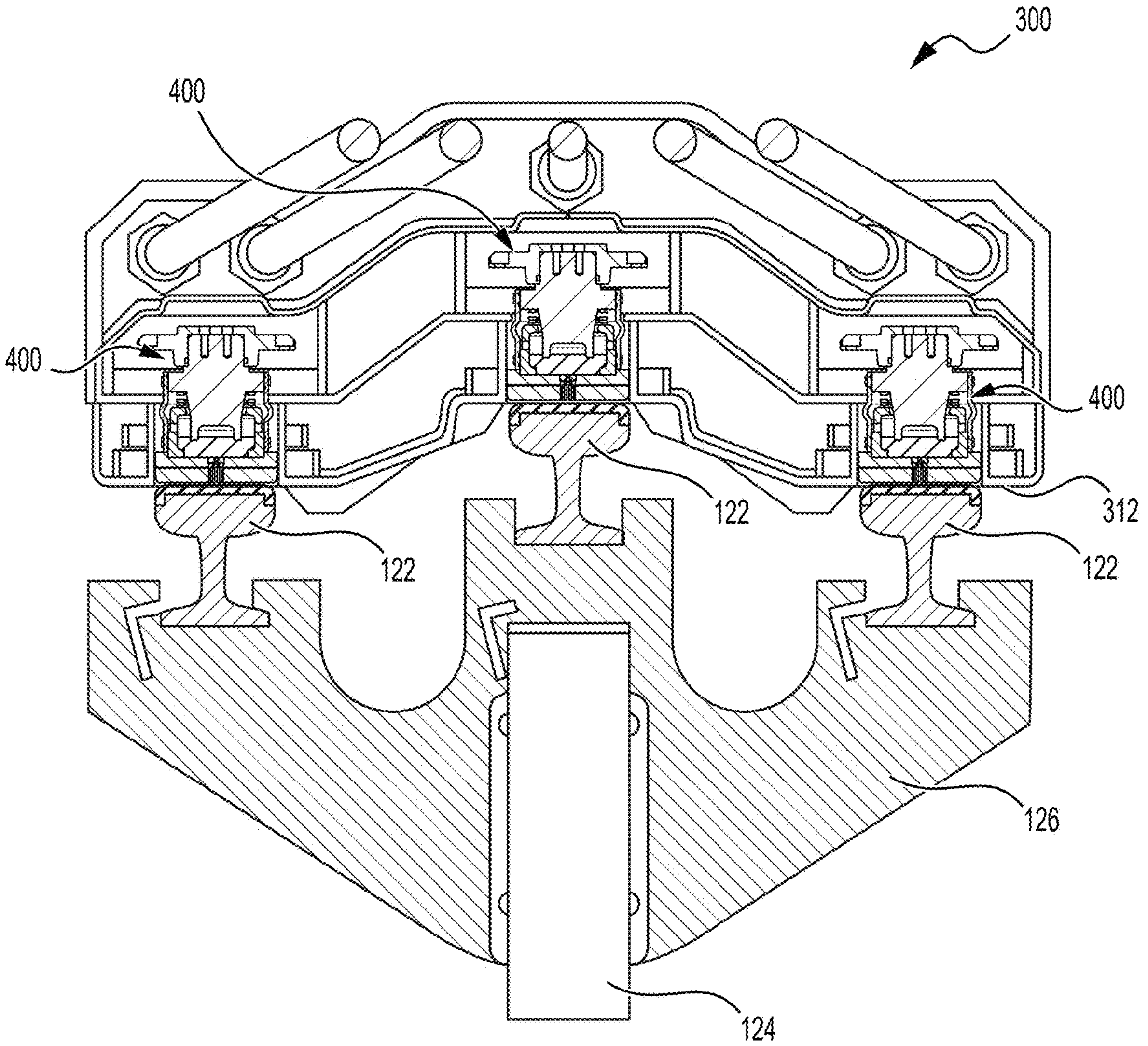
FIG. 3 a cross-sectional view of the contactor assembly, of FIG. 1, in contact with a plurality of conductor rails.

FIG. 2 is a bottom perspective view of the contactor assembly 300 of FIG. 1, and FIG. 3 is a cross-sectional view of the contactor assembly 300 of FIG. 1, in contact with a plurality of conductor rails 122. Referring now generally to FIGS. 2-3, the contactor assembly 300 is configured to interface with the electricity-conducting rail system 120 and includes a base 310 and a plurality of brush assemblies 400 (FIG. 3). Each of the plurality of brush assemblies 400 are electrically connected to a busbar (not shown) within the contactor assembly 300. The base 310 may comprise a plurality of openings exposing a bottom side 436 of the plurality of brush assemblies 400 (FIG. 2). The brush assemblies 400 may be positioned such that the bottom sides 436 are exposed. For example, the bottom sides 436 may be aligned with a bottom surface 312 of the base 310, or the bottom sides 436 may extend (e.g., protrude) past the bottom surface 312 of the base 310. When in an operating state, the bottom side 436 of the plurality of brush assemblies 400 may be exposed or otherwise extend from the base 310 to slide along the top surface of the plurality of conductor rails 122 (FIG. 3) to collect electrical energy. As exemplified in FIG. 2, the brush assemblies 400 may be arranged in a three-by-three matrix, such that there are three groups of linearly-aligned brush assemblies 400, with each group located in a first side region 313, a second side region 314, and a central region 315, respectively. However, more or less brush assemblies 400 may be used, such as only three, six, or twelve conducting terminals 320, and the brush assemblies 300 may be arranged in a different manner.

Figure 4:
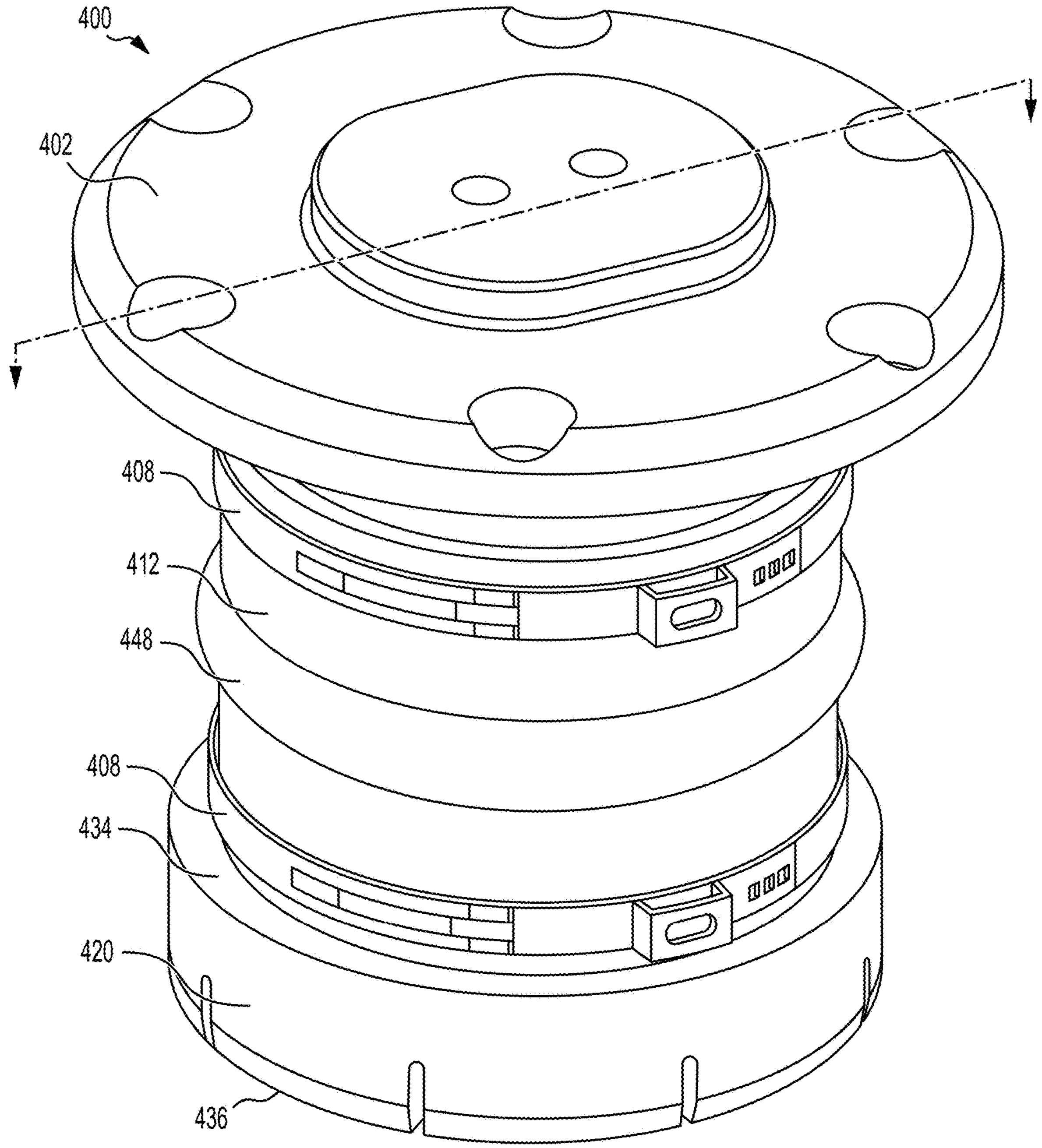
FIG. 4 is a front perspective view of a brush assembly of the contactor assembly of FIG. 1.
Figure 5:
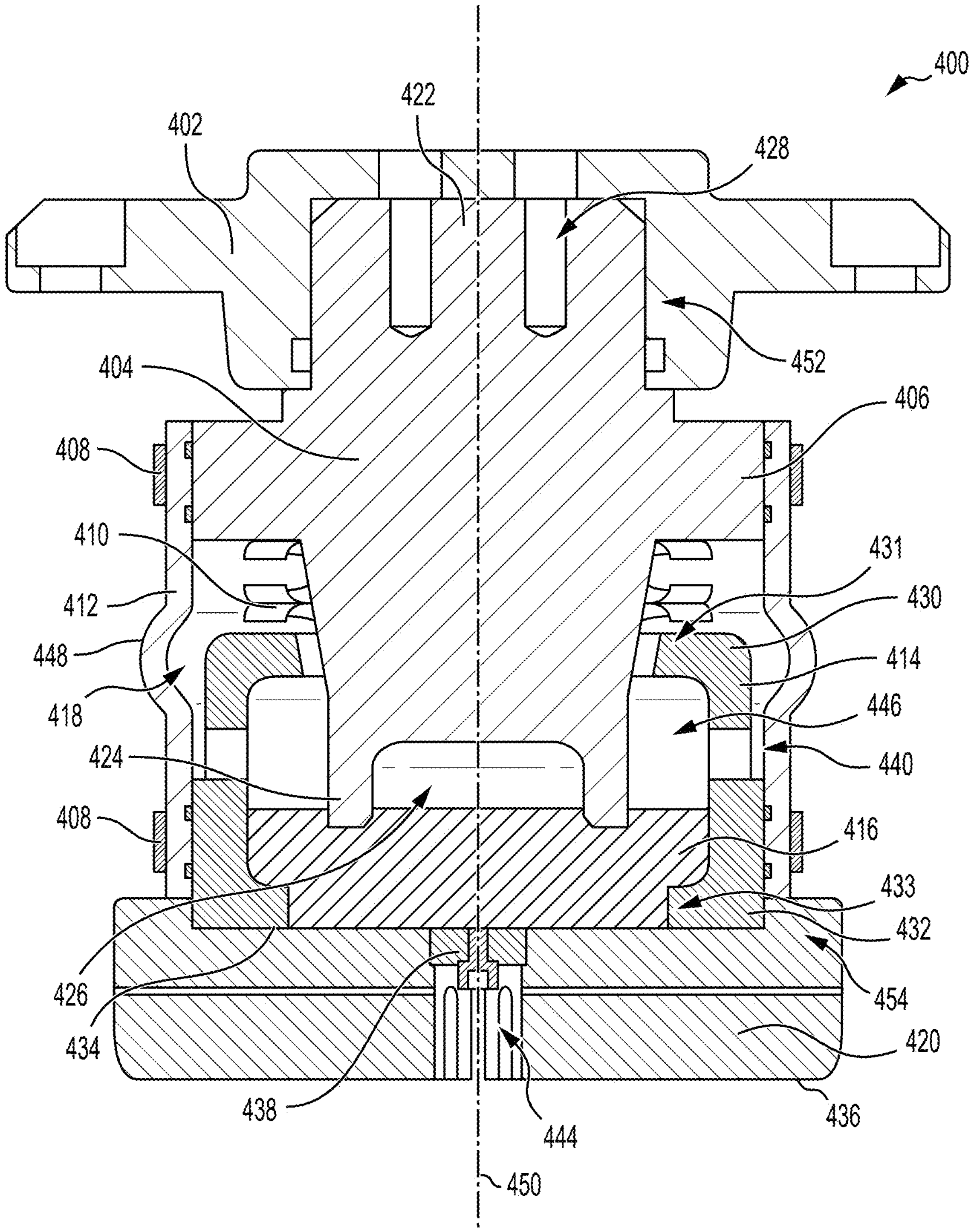
FIG. 5 is a cutaway view of a brush assembly of the contactor assembly of FIG. 1

FIG. 4 is a front perspective view of the brush assembly 400 of the contactor assembly 300, and FIG. 5 is a cutaway view of the brush assembly 400 of the contactor assembly 300. Referring now generally to FIGS. 4-5, the brush assembly 400 may include a terminal element, slug 404, attached to a base portion 402 of the contactor assembly 300, and a contact element, such as brush 420, axially spaced from the slug 404 along an axis 450 extending through the center of the brush assembly 400. The brush assembly 400 may further include a cup 414 between the brush 420 and the slug 404. Additionally, a flexible material or sleeve, such as hump hose 412, extends between the brush 420 and the slug 404. As such, the hump hose 412 surrounds at least a portion of the slug 404 and the cup 414 and forms an internal chamber 418. Within the internal chamber 418, may be an electrically conductive fluid 416. The brush assembly 400 also includes a spring 410 between the cup 414 and the slug 404.

The slug 404 may have an elongate shape, with a first attachment end 422 attached to the base portion 402 of the contactor assembly 300, and a second free end 424 opposite the attachment end 422 and extending towards the brush 420. The free end 424 may extend into an inner cavity 446 of the cup 414, such that it is partially received within the cup 414. The slug 404 may also include a flange 406 between the attachment end 422 and the free end 424. The attachment end 422 may be positioned within a recess 452 of the contactor assembly 300 and include connection interfaces 428 for connecting the slug 404 to the base portion 402. The free end 424 may optionally include a recess 426 that reduces the amount of displacement of the electrically conductive fluid 416 when the brush assembly 400 is compressed, as discussed further below. The slug 404 may be conductive, such that current or power may flow through the slug 404. The slug may be made from copper or another conductive material.

The slug 404 may be attached to the base portion 402 of the contactor assembly 300 by a suitable attachments means. For example, the slug 404 may be bolted to the base portion 402, with bolts extending from the contactor assembly 300 into the connection interfaces 428. In some examples, the attachment means may be electrodes allowing current or power to flow from the slug 404 to the contactor assembly 300. In other examples, the slug 404 may integrally formed with the contactor assembly 300.

The elongate shape of the slug 404 may taper from the flange 406 to the free end 424. In other examples, the slug 404 may have a different shape. For example, the slug 404 may be cylindrical, spherical, or prismatic, or another shape that has a cross sectional area that allows current transfer without significant heating.

The brush 420 may be generally disk shaped, with a first bottom side 436 that faces and contacts the rails 122, and a second top side 434 that faces the base portion 402 of the contactor assembly 300. The brush 420 may include a recess 454 on the top side 434 for receiving the cup 414. The brush 420 may also include a central passage 444 between the bottom side 436 and the top side 434, as well as a fluid tight plug assembly 438 for blocking the central passage 444. The brush 420 may be made from carbon, or another suitable material.

Figure 6B:
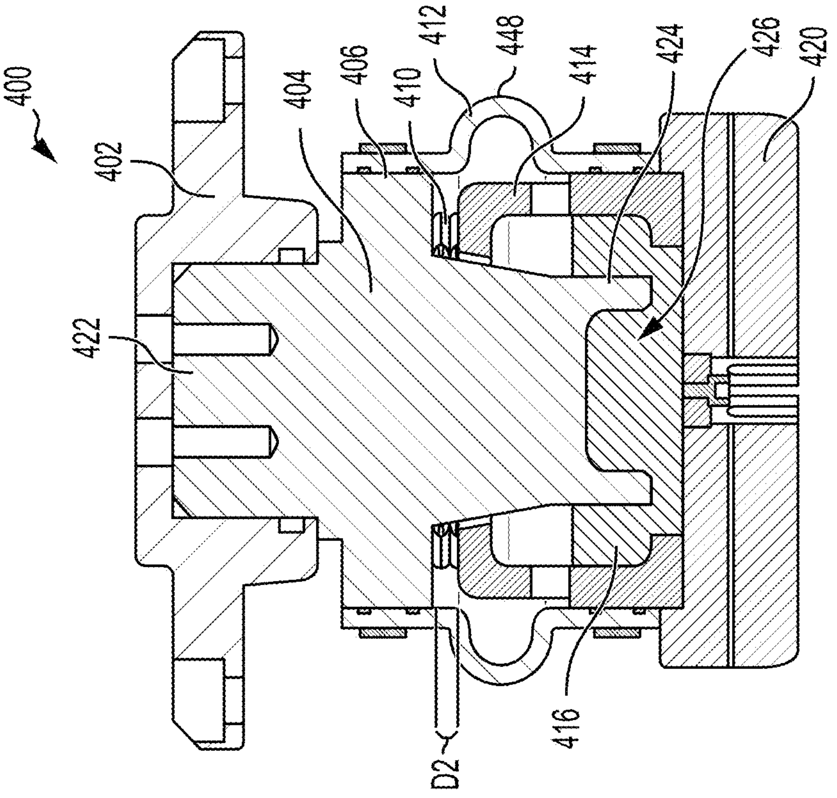
FIG. 6A shows the brush assembly in an uncompressed state and FIG. 6B shows the brush assembly in a compressed state.

The cup 414 may be cylindrically shaped, with a bottom end 432 attached to the top side 434 of the brush 420 via adhesive or another suitable attachment means, and a top end 430 opposite the bottom end 432. The cup 414 may have an inner cavity 446 that extends from the bottom end 432 to the top end 430. The bottom end 432 may be open to the brush 420 via opening 433 and the top end 430 may be open to the internal chamber 418 via opening 431. The cup 414 may also include passages 440 radially disposed through the exterior of the cup 414 between the bottom end 432 and the top end 430. In such a manner, electrically conductive fluid 416 may circulate within internal chamber 418 through passages 440 and opening 431 depending on the orientation of the brush assembly 400. In other words, if brush assembly 400 were to be tilted to the right from the orientation shown in FIG. 5, electrically conductive fluid 416 may pass through either or both of opening 431 and passage 440 and into internal chamber 418. Further, if reoriented back towards the orientation shown in FIG. 5, electrically conductive fluid 416 may re-enter inner cavity 446 through either or both of opening 431 and passage 440. The cup 414 may be made from a single piece of stainless steel. In other embodiments, the cup 414 may be made from a different material and may be made from multiple pieces joined together. Although the cup 414 in FIGS. 5-6B is shown as having two passages 440, in other examples, the cup 414 may have a different number of passages 440 or no passages 440. In some embodiments, the cup 414 may be omitted, and the brush 420 may be fabricated to include interfaces for connection to the spring 410 and the hump hose 412.

The spring 410 may extend between the top end 430 of the cup 414 and the flange 406 of the slug 404. As the brush 420 is attached to the cup 414, the spring may bias the brush 420 and the slug 404 apart, such that the brush 420 is urged downwards relative to the slug 404. The spring 410 may also be positioned at different locations within the brush assembly 400 so long as the spring 410 urges the brush 420 and the slug 404 apart. For example, the spring 410 may connect to the brush 420 and the base portion 402. In the Example shown in FIG. 5, the spring 410 is within the internal chamber 418 formed by the hump hose 412. In other examples, the spring may be external to the hump hose 412. The spring 410 may be a wave spring that offers a more constant force profile relative to other types of compression springs. The spring 410 may also be another type of compression spring.

The hump hose 412 may extend at least a partial distance between the brush 420 and the slug 404, such that the hump hose 412 encompass (e.g., encloses, surrounds, contains) at least the top end 430 of the cup 414 and the free end 424 of the slug 404. The hump hose 412 may be clamped at each end, with the bottom end of the hump hose 412 being clamped (or otherwise affixed) near the bottom end 432 of the cup 414 by a clamp 408, and the top end of the hump hose 412 being clamped (or otherwise affixed) to the flange 406 of the slug 404 by another clamp 408. In some examples, the hump hose 412 may be clamped to a different portion of the cup 414 so long as the cup 414 (or brush 420) is sealed to the slug 404 by the hump hose 412 such that an internal chamber 418 is formed between them. In other examples, the hump hose 412 may be attached directly to the brush 420.

The hump hose 412 may include at least one hump 448 that may expand radially outward when the brush assembly is compressed, allowing the ends of the hump hose 412 to move towards one another. The hump hose may be made from silicone, rubber, or another suitable material that allows the hump hose to be compressed. Although the flexible material or sleeve is shown as the hump hose 412 in FIGS. 4-6B, in other examples, the flexible material or sleeve may be another suitable connector.

The electrically conductive fluid 416 may be retained within the internal chamber 418 of the hump hose 412. When the brush assembly 400 is held upright (e.g., as in the arrangement shown in FIG. 5), the electrically conductive fluid 416 may be collected (e.g., via gravity) towards the bottom end 432 of the cup 414. The electrically conductive fluid 416 may occupy enough volume within the cup 414 when the brush assembly 400 is upright that the electrically conductive fluid 416 comes into contact with the free end of the slug 404. As noted above, when the brush assembly 400 is tilted, the electrically conductive fluid 416 may pass through the passages 440 of the cup 414 such that electrically conductive fluid 416 exits the cup 414 but remains within the internal chamber 418 formed by the hump hose 412. The electrically conductive fluid 416 may enter the cup 414 through the passages 440 of the cup 414, or opening 431, when the brush assembly is returned or moved to an upright position (e.g., as shown in FIG. 5). The fluid may enter or exit the internal chamber 418 via the central passage 444 when the plug assembly 438 is removed, allowing the brush assembly to be filled or drained of electrically conductive fluid as necessary. In some examples, the electrically conductive fluid 416 may be a liquid alloy including gallium, indium, and tin. For example, the electrically conductive fluid 416 may be Galinstan. In other examples, the electrically conductive fluid 416 may be another material, and may not be a fluid.

Figure 6A:
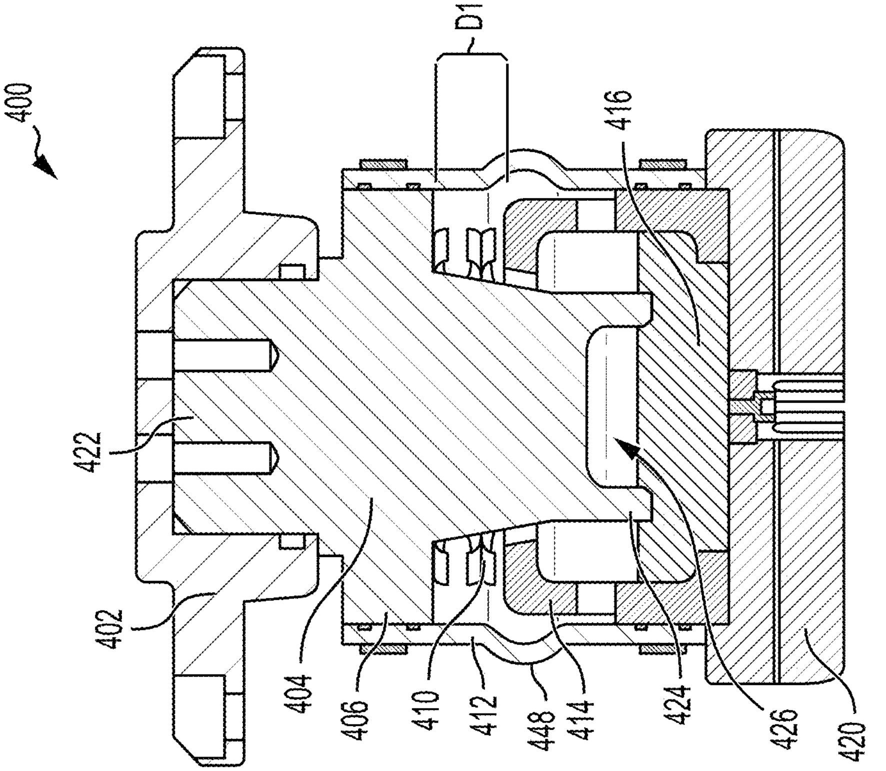

The brush assembly 400 may transition between an uncompressed state and a compressed state. FIG. 6A shows the brush assembly 400 in the uncompressed state, and FIG. 6B shows the brush assembly in the compressed state. In the uncompressed state shown in FIG. 6A, the spring 410 may urge the cup 414 and the slug 404 apart (e.g., apply a biasing force) such that the distance between the cup 414 and the flange 406 of the slug 404 (e.g., the length of the uncompressed or unstretched spring 410) is a distance D1. In the compressed state shown in FIG. 6B, the force of the spring 410 may be overcome, such that the distance between the cup 414 and the flange 406 of the slug 404 is a distance D2, which is less than the distance D1. In some examples, the distance D1 may be about 11 mm, and the distance D2 may be about 3 mm, such that the difference in height of the brush assembly 400 between the uncompressed and compressed states is about 8 mm. The difference between D1 and D2 may be the amount of travel of one end of the spring 410 or the hump hose 412 relative to the other end (e.g., the amount the spring is compressed). For example, the end of the spring 410 and the hump hose 412 nearest the base portion 402 may travel 8 mm relative to the brush 420. In other examples, the spring 410 may travel or compress between about 5 mm and about 10 mm. In other examples, the spring 410 may travel or compress between about 10 mm and about 15 mm. In other examples, the spring 410 may travel about 20 mm. In other examples, the spring 410 may travel about 30 mm. In other examples, the spring 410 may travel about 40 mm. In other examples, the spring 410 may travel about 50 mm. In other examples the spring 410 may travel or compress about 100 mm. In other examples the spring 410 may travel or compress about 150 mm. In other examples the spring 410 may travel or compress about 200 mm. In other examples, the spring 410 may travel or compress a different amount. In the compressed state of some examples, the spring 410 may apply a biasing force of about 44.8 N (about 55 lbf). In other examples, the spring 410 may apply a different amount of biasing force in the compressed state. In both the compressed and uncompressed states, the slug 404 may contact the electrically conductive fluid 416 when the brush assembly is held upright. As the spring 410 is compressed, such that the brush assembly transitions from the uncompressed state to the compressed state, the slug 404 may contact a larger volume of electrically conductive fluid 416.

INDUSTRIAL APPLICABILITY

The disclosed aspects of the brush assembly 400 of the present disclosure may be used to maintain contact between an electricity-conducting rail system 120 and a contactor assembly 300 of an electricity-conducting connector assembly 200 in a mobile machine power system 100 by providing an extendable connection between the brush 420 and the contactor assembly 300.

The brush assembly 400 may aid in applying downward pressure on a brush 420 in order to maintain a better (e.g., more consistent, more reliable, more effective) electrical connection between the electricity-conducting rail system 120 and the electricity-conducting connector assembly 200 of the mobile machine power system 100. The brush assembly 400 may be simpler than previous designs, and may be passive rather than active. For example, due to the inclusion of spring 410, the brush 420 is passively biased away from the slug 404 such that an active control of a biasing mechanism (such as a hydraulic or pneumatic biasing mechanism) is not necessary, thereby simplifying construction, reducing manufacturing costs, and reducing downtime for replacement or repair of such a system, for example, due to a fluid leak. The brush assembly 400 may therefore be an improved retention system for connecting the contactor assembly to a rail system 120. The brush assembly may also be more compact than previous designs, while attaching to the contactor assembly 300 in the same way as previous designs, which may allow the brush assembly to be easily inserted into existing contactor assemblies 300.

Figure 7:
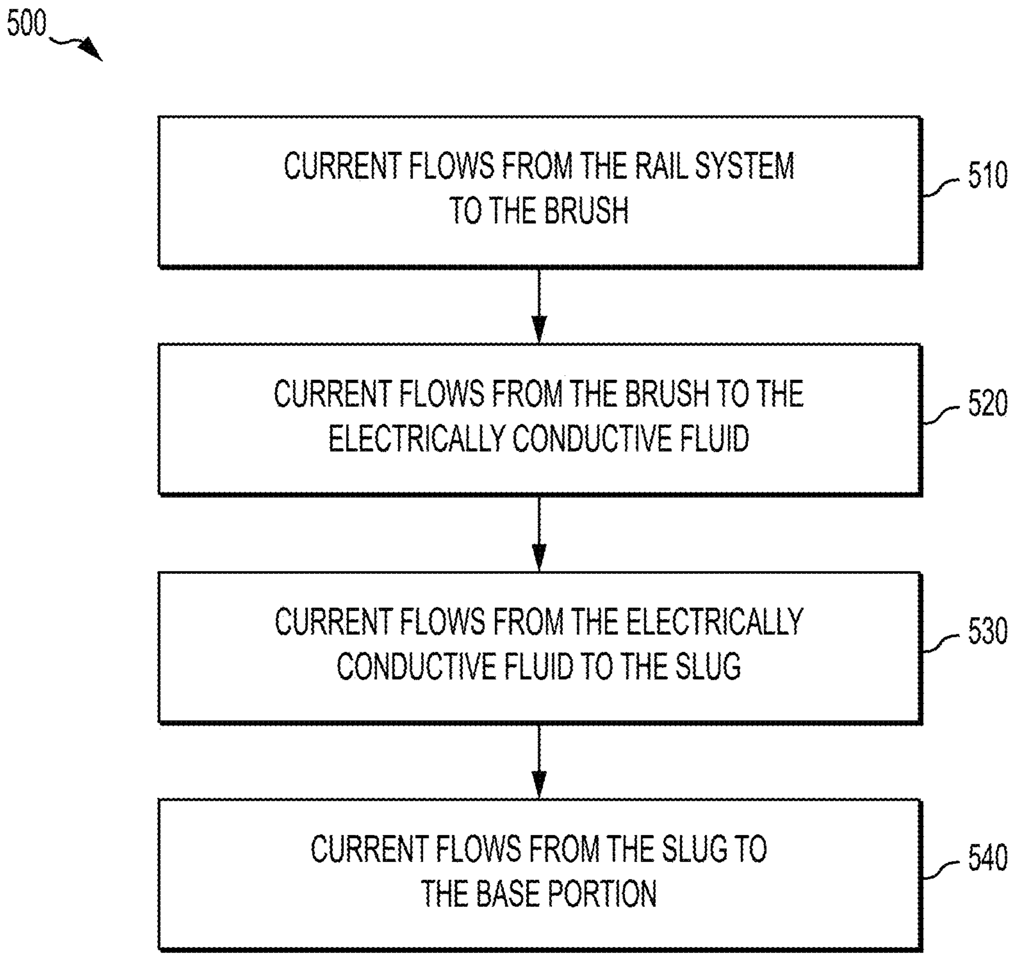
FIG. 7 provides a flowchart depicting an exemplary method for transferring current from the rail system to the contactor assembly.

FIG. 7 is a flowchart depicting an exemplary method 500 for transferring current or power from the rail system 120 to the electricity-conducting connector assembly 200. In a step 510, current or power may flow from one of the plurality of conductor rails 122 into the brush 420. In a step 520, current or power may flow from the brush 420 into the electrically conductive fluid 416. In a step 530, the current or power may flow from the electrically conductive fluid 416 into the free end 424 of the slug 404. In a step 540, the current or power may flow from the attachment end of the slug 404 into the base portion 402 and the electricity-conduction connector assembly 200.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A brush assembly for electrically connecting a contactor assembly to an electricity-conducting rail system, the brush assembly comprising:

a contact element;

a terminal element extending from a portion of the contactor assembly towards the contact element;

a cup having an inner cavity, a bottom end, and a top end, the bottom end of the cup being attached to the contact element;

a flexible material between the contact element and the terminal element, the flexible material forming a chamber;

an electrically conductive fluid within chamber; and a biasing member between the terminal element and the cup.

2. The brush assembly of claim 1, wherein the cup includes at least one radially disposed through passage.

3. The brush assembly of claim 2, wherein the cup is configured to pass the electrically conductive fluid between the inner cavity of the cup and the chamber via the at least one radially disposed through passage.

4. The brush assembly of claim 1, wherein a portion of the terminal element extends into the inner cavity of the cup.

5. The brush assembly of claim 1, wherein at least a portion of the electrically conductive fluid is retained within the inner cavity of the cup.

6. The brush assembly of claim 1, wherein the biasing member is a wave spring.

7. The brush assembly of claim 1, wherein the terminal element includes a flange, wherein the biasing member is positioned to bias the flange away from the cup.

8. The brush assembly of claim 1, wherein the terminal element includes a flange and the flexible material includes a first end coupled to the flange, and a second, opposite end coupled to the cup.

9. A trailing arm assembly for use in a dynamic energy transfer system, the trailing arm assembly comprising:

a boom assembly;

a trailing arm assembly; and a contactor assembly having a brush assembly, the brush assembly further including:

a contact element having a first side and a second side opposite the first side;

a terminal element;

a flexible material extending from the terminal element towards the contactor assembly and forming a chamber around the terminal element;

an electrically conductive fluid within the chamber formed by the flexible material; and a biasing member located axially between the terminal element and the contact element, the biasing member configured to passively bias the contactor assembly away from the terminal element.

10. The trailing arm assembly of claim 9, wherein the terminal element moves towards the contact element as the biasing member is compressed.

11. The trailing arm assembly of claim 9, wherein the terminal element includes a recess.

12. The trailing arm assembly of claim 9, wherein the terminal element contacts a larger volume of fluid as the biasing member is compressed.

13. The trailing arm assembly of claim 9, wherein a cup is attached to the contact element, the terminal element has a flange, and the biasing member extends between a top end of the cup and the flange.

14. The trailing arm assembly of claim 13, wherein the flexible material is clamped to the flange of the terminal element.

15. The trailing arm assembly of claim 9, wherein upon connection between the contact element to an energy source, electricity flows from the contact element, through the electrically conductive fluid, and through the terminal element.

16. A brush assembly for electrically connecting a contactor assembly to an electricity-conducting rail system, the brush assembly comprising:

a contact element having a first side and a second side;

a terminal element having a flange;

a cup attached to the second side of the contact element;

a flexible material extending between the terminal element and the contact element, the flexible material forming a chamber; and a biasing member between the cup and the terminal element, wherein the biasing member passively biases the contact element away from the terminal element.

17. The brush assembly of claim 16, wherein the terminal element extends into the cup.

18. The brush assembly of claim 16, wherein the flexible material is clamped to the cup and the flange.

19. The brush assembly of claim 16, further including a fluid element within flexible material, the cup being configured to permit the fluid element to flow into and out of the cup as the brush assembly moves.

20. The brush assembly of claim 16, wherein at least a portion of the flexible material expands radially outward as the brush assembly is compressed.

* * * * *